US006712976B2

(12) United States Patent
Manzone

(10) Patent No.: US 6,712,976 B2
(45) Date of Patent: Mar. 30, 2004

(54) DUAL-ACTION DECONTAMINATION SYSTEM

(75) Inventor: Rodolfo B. Manzone, Scottsdale, AZ (US)

(73) Assignee: Abtech Industries, Inc., Scottsdale, AZ (US)

( * ) Notice: Subject to any disclaimer, the term of this patent is extended or adjusted under 35 U.S.C. 154(b) by 284 days.

(21) Appl. No.: 09/952,258

(22) Filed: Sep. 13, 2001

(65) Prior Publication Data

US 2003/0047514 A1 Mar. 13, 2003

(51) Int. Cl.[7] .......................... B01J 33/00; B01J 20/26; B01J 39/00
(52) U.S. Cl. ...................... 210/668; 210/693; 210/764; 502/1; 502/402
(58) Field of Search ............................... 210/660, 690, 210/691, 692, 693, 694, 263, 282, 764, 668; 502/1, 402

(56) References Cited

U.S. PATENT DOCUMENTS

| | | | | |
|---|---|---|---|---|
| 4,601,831 A | * | 7/1986 | Cook | 210/692 |
| 4,923,894 A | * | 5/1990 | Kanda et al. | 514/493 |
| 5,000,618 A | * | 3/1991 | Greenley | 405/129.7 |
| 5,006,267 A | * | 4/1991 | Vaughn et al. | 210/755 |
| 5,180,704 A | | 1/1993 | Reindl et al. | 502/402 |
| 5,637,211 A | * | 6/1997 | Neff | 210/170 |
| 5,651,978 A | | 7/1997 | Tomioka et al. | 424/421 |
| 5,744,239 A | * | 4/1998 | Buccellato et al. | 428/411.1 |
| 5,863,440 A | | 1/1999 | Rink et al. | 210/693 |
| 5,954,869 A | | 9/1999 | Elfersy et al. | 106/287.16 |
| 5,981,668 A | | 11/1999 | Fujita et al. | 525/329.9 |
| 6,045,596 A | | 4/2000 | Holland, Jr. et al. | 55/385.2 |
| 6,080,307 A | | 6/2000 | Morris et al. | 210/163 |
| 6,099,723 A | | 8/2000 | Morris et al. | 210/170 |
| 6,106,707 A | * | 8/2000 | Morris et al. | 210/163 |
| 6,143,172 A | | 11/2000 | Rink et al. | 210/237 |
| 6,180,162 B1 | | 1/2001 | Shigeru et al. | 427/11 |
| 6,182,365 B1 | * | 2/2001 | Tseng et al. | 30/34.2 |
| 6,231,758 B1 | | 5/2001 | Morris et al. | 210/163 |
| 6,344,519 B1 | | 2/2002 | Rink et al. | 525/97 |
| 6,403,716 B1 | * | 6/2002 | Nishihara | 525/191 |
| 6,531,059 B1 | | 3/2003 | Morris et al. | 210/164 |
| 6,541,569 B1 | | 4/2003 | Morris et al. | 525/95 |
| 6,543,753 B1 | * | 4/2003 | Tharp | 261/122.2 |
| 2001/0052501 A1 | * | 12/2001 | Sparapany et al. | 210/732 |
| 2002/0151647 A1 | * | 10/2002 | Laughner et al. | 525/63 |
| 2002/0169230 A1 | * | 11/2002 | Redlich et al. | 523/122 |
| 2003/0038084 A1 | * | 2/2003 | Mitchell et al. | 210/663 |
| 2003/0047512 A1 | * | 3/2003 | France et al. | 210/660 |

FOREIGN PATENT DOCUMENTS

| | | | |
|---|---|---|---|
| EP | 0 539 624 | 12/1996 | 3/6 |
| WO | WO 97/29830 | 8/1997 | 45/18 |

OTHER PUBLICATIONS

AbTech Industries, "Ulltra–Urban Filter with OARS OnBoard", printed on Aug. 23, 2001 from http://www.abtechindustries.com/Ultra$_{13}$ UrbanFilter.htm.

Villahoz, Marcelo D., "New Antimicrobial Technology for Wastewater Treatment Plants", *American Filtration & Separations Society Water & Wastewater Filtration Conference*, BioShield Technologies Inc., pp. 1–41 Jul. 25–26, 2000.

* cited by examiner

Primary Examiner—Chester T. Barry
(74) Attorney, Agent, or Firm—Louis J. Hoffman; Edwin A. Suominen

(57) ABSTRACT

Hydrophobic polymer particles (e.g., granules or fragments) employed as filter media, e.g., for filtering runoff water, include an antimicrobial compound on exterior surfaces and can reduce proliferation of microbial organisms as well as sorb chemical contaminants from the water. By employing this dual decontamination action, filter systems employing such particles can improve the quality of runoff water (or other contaminated water streams) and reduce the risk presented by potentially harmful organisms.

11 Claims, 3 Drawing Sheets

DUAL-ACTION DECONTAMINATION SYSTEM

BACKGROUND OF THE INVENTION

Typical water runoff contains a surprisingly large amount of oil and other contaminants. The resulting contamination of natural receiving water incurs enormous annual costs, both financial and environmental. For example, a government study in one published article showed that storm water sampled from street sites contained an "event mean concentration" of 2.2 mg. of oil per liter of runoff water. Shepp, "Petroleum Hydrocarbon Concentrations Observed in Runoff from Discrete, Urbanized Automotive-Intensive Land Uses," Watershed '96. If one meter of rain per year falls on a street 10 meters wide, then at that observed mean rate, the annual runoff from each kilometer of street will contain about 275 liters of hydrocarbons.

Various systems have been developed to remove hydrocarbons and other chemical contaminants from runoff water. For example, U.S. Pat. No. 6,080,307, and commonly owned with the present application, discloses a system for recovering trash and oil from water passing into storm drains or the like.

Unfortunately, a report of the National Resources Defense Council ("Testing the Waters 2001," available from www.nrdc.org) makes it clear that such conventional systems for chemical decontamination and debris removal are inadequate for effective purification of runoff water. Eighty-five percent of beach closings and health advisories occurring in 2000 were the result of high bacteria levels, according to the report, and "polluted runoff and storm water caused or contributed to more than 4,102 closings or advisories." Clearly there remains a need for further improvements in the purification of runoff water to alleviate continued concerns about public health.

SUMMARY OF THE INVENTION

In accordance with aspects of the present invention, including various advantageous methods, hydrophobic polymer granules or fragments employed as filter media, e.g., for filtering runoff water, include an antimicrobial compound on their surfaces. Advantageously, such polymer granules or fragments are able to reduce proliferation of microbial organisms in the water in addition to sorbing chemical contaminants from the water. (As used herein, "reduce proliferation" includes reducing counts or concentrations of live or otherwise active microorganisms, preventing microorganisms from reproducing or otherwise proliferating, or both.) By employing this dual decontamination action, filter systems employing such particles can further improve the quality of runoff water (or other water streams) and reduce the risk presented by potentially harmful organisms in the water.

In a particularly advantageous method of the invention for preparing filtering and decontamination media, polymer granules having high sorbency for one or more predetermined contaminant liquids, such as oil or other hydrocarbons, are irrigated with a solution that contains a reactive antimicrobial compound. (As used herein, the term "irrigate" means applying solution to a polymer material by any suitable technique, including spraying, static immersion, centrifugal innundation, or conjoined fluid flow of particles and solution.) The polymer granules are phobic to water (i.e., hydrophobic) and to the liquid of the solution (which may itself be water) and thus do not sorb any significant quantities of the solution even during irrigation. Because the antimicrobial compound in the solution is reactive, it becomes grafted to the polymer surfaces of the granules without the solution being substantially sorbed (i.e., absorbed or adsorbed) by the granules. The resultant polymer granules are capable, upon immersion in contaminated water, of both sorbing contaminant liquids and reducing biological contamination in the water, a clearly beneficial property.

The method can also include drying (at least substantially) the solution-irrigated polymer granules and then extruding the polymer granules into fragments of filter media. Alternatively, the method can include forming unirrigated granules into fragments of filter media, such as using an extrusion process, then irrigating the formed fragments. Although many of the embodiments disclosed herein are described with reference to irrigated granules later formed into fragments, the inventor also contemplates alternatives using granules formed into fragments and then irrigated. The method can further include supporting the fragments about an open recess within a filter module. When the contaminant liquids include hydrocarbons, such a filter module is capable of both removing oil from water passing into the open recess and reducing proliferation of microbial organisms in the water. Thus, an advantageous result of the method is a further improvement in the purification of runoff water over that which is conventionally available.

A fragment of filter media according to one aspect of the invention is comprised of: a matrix of compliant, hydrophobic, olefinic polymer; an oil-sorbent, hydrophobic copolymer in the matrix; and an antimicrobial compound. The antimicrobial compound can be grafted, in one useful embodiment, e.g., by the advantageous method mentioned above, to a portion of the polymer of the matrix and to a portion of the oil-sorbent, hydrophobic copolymer in the matrix. Alternatively, the antimicrobial compound can be grafted to the copolymer alone (or, although less preferred, to the granules of the matrix alone). Consequently, the fragment is advantageously capable of both sorbing oil from surrounding water and reducing proliferation of microbial organisms in the water. (As used herein, the term "particles" refers to either granules or fragments, including granules in loose form as well as granules formed into fragments, and including fragments alone or linked to adjacent fragments to form a coherent polymer body of macroscopic dimensions.)

A filter system according to another aspect of the invention includes a multitude of irregular, macroscopic fragments of the type discussed above and a filter module that supports the fragments about an open recess. Such a filter system is highly desirable in that it can perform the dual-action decontamination of both sorbing oil, grease, etc. from water passing into the open recess and reducing proliferation of microbial organisms in the water or in residues left in (or between) the filtering fragments or the filter module.

Also highly desirable is a method of the invention for improving chemical and biological purity of water entering a storm drain. The method includes sorbing one or more targeted contaminants from the water by directing flow of the water through interstices of a multitude of irregular, macroscopic fragments that are sorbents of the contaminants, e.g., fragments of the type discussed above. In the method, the fragments include an antimicrobial compound on their surfaces, e.g., a reactive compound grafted to surfaces of polymer fragments. Proliferation of microbial organisms in water passing over those surfaces is advantageously reduced even as chemical contaminants are sorbed from the water.

These and other compositions, systems, and methods of the invention can employ particular materials according to various aspects of the invention for particularly favorable results. First, the antimicrobial compound can be an organosilane compound not susceptible to self-condensation in water, which avoids the use of more hazardous solutions. Second, the contaminant-sorbent, hydrophobic copolymer can be styrene-butadiene-styrene (SBS) or hydrogenated styrenic block copolymer ("SEBS"), both of which are highly oil-sorbent, non-toxic, and remain coherent after becoming oil-saturated. The compliant, hydrophobic polymer can be ethylene propylene diene monomer (EPDM) or ethylene propylene monomer (EPM), both of which permit formation of a polymer matrix that supports the oil-sorbent, hydrophobic copolymer while also absorbing a certain quantity of oil.

The above summary does not include an exhaustive list of all aspects of the present invention. Indeed, the inventor contemplates that the invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

Various embodiments of the present invention are described below with reference to the drawings, wherein like designations denote like elements.

DESCRIPTION OF PREFERRED EXEMPLARY EMBODIMENTS

In various methods and systems according to aspects of the present invention, a multitude of hydrophobic polymer granules or fragments employed in filter media include (or are made to include) an antimicrobial compound on their surfaces. Such a configuration provides a significant benefit in allowing the polymer material to reduce proliferation of microbial organisms in the water or on the material while retaining their ability to sorb chemical contaminants from the water. By employing this dual decontamination action, filter systems employing such granules or fragments can further improve the quality of runoff water (or other water streams) and reduce the risk presented by potentially harmful organisms in the water or in filters.

Figure 3:
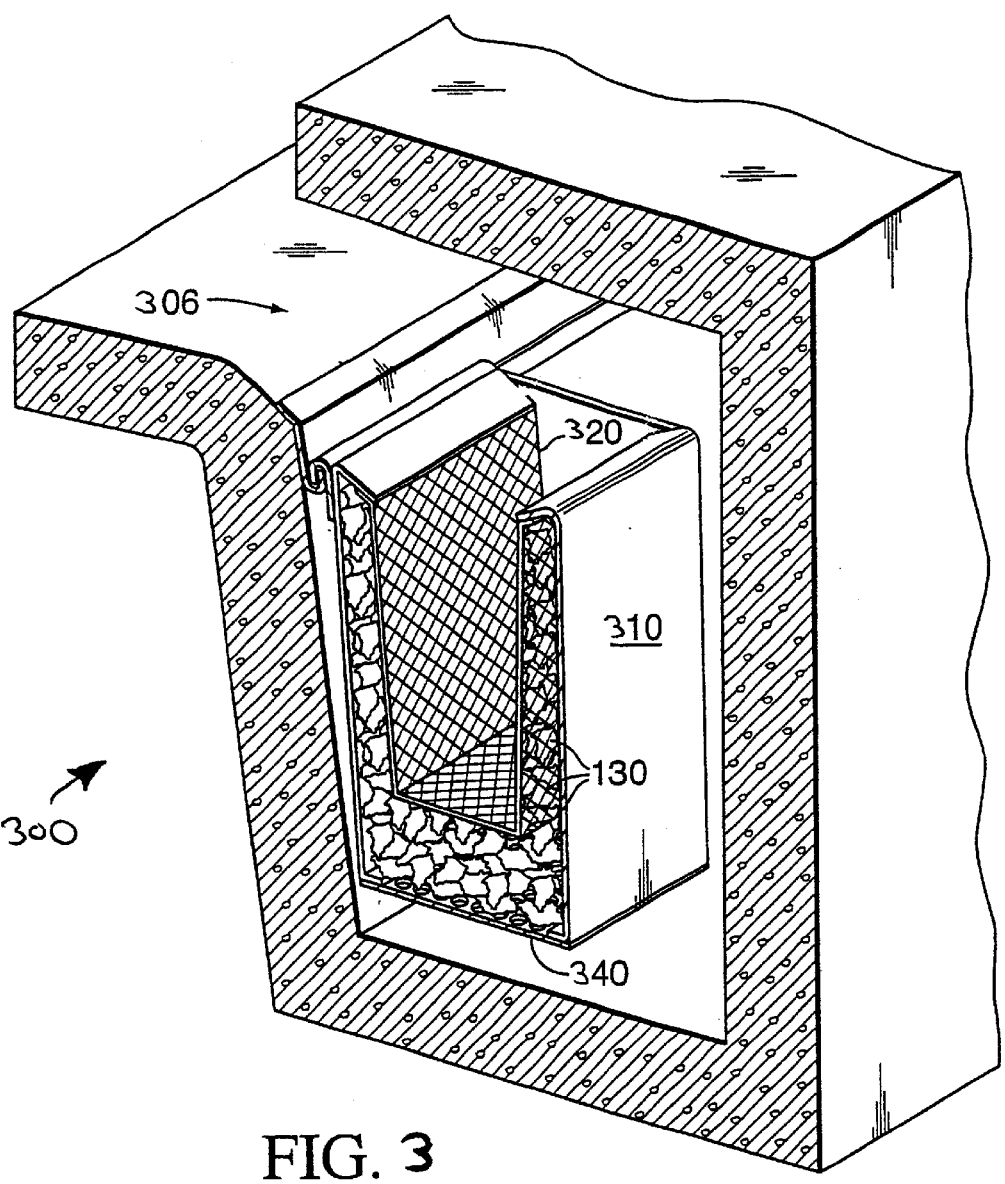
FIG. 3 is a cutaway perspective view of a filter system employing filter media including copolymer fragments of the type of FIG. 1.

In an exemplary method that may be better understood with reference to FIG. 3, for example, runoff water (not shown) enters a curb-inlet 306 of a storm drain and passes into exemplary filter system 300, which includes a hopper 310. After entering hopper 310, the water passes through a screen of a basket 320, which traps trash items, and into a quantity of filter media including polymer fragments 130. Fragments 130 perform the dual action of sorbing contaminants and reducing the proliferation of microbial organisms in the water as it passes through interstices of the fragments. Consequently, overall purity of water passing out of hopper 310 (through perforated steel or plastic bottom 340) is improved both chemically and biologically.

Additional disclosure of system 300 is found in commonly owned U.S. Pat. No. 6,106,707 entitled "Curb-Inlet Storm Drain Systems for Filtering Trash and Hydrocarbons," to Morris and Stelpstra, referred to herein as the '707 Patent. As with all patents referenced herein, the '707 Patent is incorporated herein by reference along with any documents incorporated by reference therein.

Figure 1:
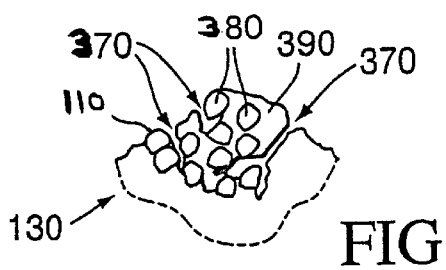
FIG. 1 is a detail view of a section through a copolymer fragment that includes an antimicrobial compound on its surface according to various aspects of the invention.
Figure 2:
FIG. 2 is an outline of the copolymer fragment of FIG. 1.

FIGS. 1 and 2 illustrate an example of a suitable copolymer fragment 130, for use inside compartment 310 of system 300. Fragment 130 includes an EPDM or EPM matrix 390 that forms a durable but permeable structure for SBS granules 380 and provides mechanical integrity to fragment 130. Surfaces of the SBS granules (e.g., surface 110 or surfaces in interstices 370) and preferably also the EPDM or EPM matrix include an antimicrobial compound for dual-action decontamination.

The '707 Patent discloses a preferred type of polymer for granules and fragments according to various aspects of the invention. When oil-water runoff comes into contact with the fragments, the copolymer material will absorb and entrap the oil. Because the copolymer material is hydrophobic, however, it will not become water-logged, and water will pass through the filter module. After the copolymer material has absorbed oil, subsequent runoff flowing past the material will not wash away the oil. Indeed, it has been found that the materials described herein can remain in contact with water continuously for at least several months, and perhaps indefinitely, without releasing the oil or allowing it to emulsify.

The principal ingredient of fragment 130 is a copolymeric material that is known to sorb oil but not water. As oil enters fragments 130, they expand somewhat. Thus, it is preferred to avoid filling compartment 310 (FIG. 3) completely with fragments 130, to prevent fragments 130 from pushing upwards into basket 320 as they expand with oil absorption.

Particularly suitable types of copolymers fall within the class of thermoplastic elastomers, such as styrene-butadiene-styrene ("SBS"), and hydrogenated styrenic block copolymer ("SEBS"), both of which are styrenic block copolymers. Styrenic block copolymers were developed for applications that require impact resistance, and that is still their primary use. SBS and SEBS are highly sorbent, non-toxic, and remain coherent after becoming oil-saturated. An alternative styrenic block copolymer, which may be employed in granules and fragments according to various aspects of the invention if the benefits of SBS and SEBS are not required, is styrene-isoprene-styrene ("SIS").

In a preferred filter media fabrication method 400, discussed below with reference to FIG. 4, SBS material formed into granules is mixed with granulated binder material. In that embodiment, granular porous SBS with about 30% styrene has been found suitable, when sifted to retain pieces in the range of sizes between 4 and 24 mesh. Preferably, the SBS product is manufactured without talc, contrary to the standard manufacturing process, to enhance inter-granular linking or bonding in the formed body.

The binder material is a compliant or flexible, hydrophobic, olefinic polymer material in a granular form and preferably having a melting point lower than that of the oil-absorbent copolymer. Polyolefinic elastomers, such as ethylene propylene monomer ("EPM") or ethylene propylene diene monomer ("EPDM") have been found suitable. The binder largely prevents fragments 130 from crumbling while being handled in dry form yet also absorbs a certain quantity of oil. In a preferred embodiment, EPDM granules sifted to retain pieces between 12 and 24 mesh were found suitable. Pieces in the range of 6–24 mesh can also be suitably employed.

About 70–90% by weight of the material of fragments 130 consists of SBS, and the remainder consists of EPDM binder in a preferred embodiment. As explained below, SBS and EPDM granules are linked and formed into fragments 130 in a way that results in SBS granules in an EPDM matrix.

In addition to having antimicrobial compound on their surfaces according to various aspects of the invention, polymer fragments according to various aspects of the invention are preferably fabricated with two main design goals in mind. First, the flow of desired liquid (e.g., water to be decontaminated) should not be unduly restricted. Restricted liquid flow limits the rate at which the liquid can be purified and decontaminated. Second, the liquid should be prevented, to the extent practical, from collecting into channels. When liquid collects into channels within a mass of filter media, it tends to come into contact with only the limited amount of treated filter media that surrounds the channels. Fragments 130 are irregularly shaped and not in powder form, which addresses the first concern by preventing them from being too compactly packed inside compartment 310 of FIG. 3, because that may restrict the flow of water. The random shapes of fragment 130 address the second concern by moving liquid laterally in compartment 310, thereby further reducing the tendency of the liquid to collect into channels.

To permit faster oil absorption and less gel blocking (a phenomenon in which a layer of absorbed oil at the exterior blocks access to inner portions of fragments 130), without increasing the distance from surface to center, it is desirable to avoid smooth exterior "skins" on outer surfaces of fragments 130. The preferred process of formation discussed below promotes this goal.

Also to reduce gel blocking, fragments 130 preferably have numerous fissures 370 extending into them from exterior surfaces and passing between the grains of SBS, as illustrated in FIG. 1. Such fissures increase the effective surface area of fragments 130 while still maintaining each as a coherent whole, permitting easy handling. The preferred formation process discussed below promotes this goal.

In one example, fragments 130 consisted primarily of irregularly shaped objects with various dimensions about a centimeter or two across. Those exemplary fragments 130 were formed of 78% SBS and 22% EPDM and had a bulk density of about 0.4–0.6 g/cc and mostly weighed about 2 to 3 grams each. Some of the fragments had broken into smaller pieces, some of which weighed as little as 0.3 to 1 grams. A few fragments consisted of pairs of normally sized fragments that had linked together, forming larger fragments about 5 to 6 grams each.

Fragments 130 have controlled bulk density, also to reduce gel blocking. With the preferred materials discussed above, bulk density greater than 0.75 g/cc tend to prevent the oil from entering the fragments, while bulk density smaller than 0.3–0.35 g/cc cause the fragments to fragment more easily, either when dry or after absorbing oil. For example, copolymer fragments 130 with a bulk density in the preferred range have enough inter-granular voids to permit oil to penetrate substantially throughout the thickness of the larger fragments 130, thereby avoiding gel blocking, while leaving them mostly intact. Fragments of such material can absorb up to five times their weight in oil.

In variations of method 400, SEBS is substituted for SBS, EPM is substituted for EPDM, or both. In another variation, fragments 130 are irrigated with a solution containing an antimicrobial compound after aggregation of the fragments in a container or agglomeration of the fragments into a coherent block of filter media. In yet another variation, SBS granules 410 are irrigated with a solution containing an antimicrobial compound separately from EPDM granules, which are either irrigated or not.

Fragments 130 of exemplary filter system 300 can have any suitable type of antimicrobial compound on their surfaces, applied by any suitable technique. A particularly advantageous method of the invention for fabricating media having contaminant-sorbent and antimicrobial properties includes irrigating a multitude of contaminant-sorbent polymer granules with a solution containing an antimicrobial compound, followed by extrusion of the granules into fragments. In the method, the antimicrobial compound and the polymer of the granules are reactive together, and the polymer is substantially phobic to water and to the solution. An antimicrobial compound and polymer are reactive together whenever the compound, in solution, can be expected to graft to the polymer. A compound grafts to a polymer whenever it forms covalent bonds with it.

The use of a polymer that is hydrophobic and also phobic to the solution (which itself may be water), is particularly advantageous because granules and fragments of such a polymer will not sorb significant amounts of water (during filtration) or solution (during grafting of the antimicrobial compound from the solution).

Figure 4:
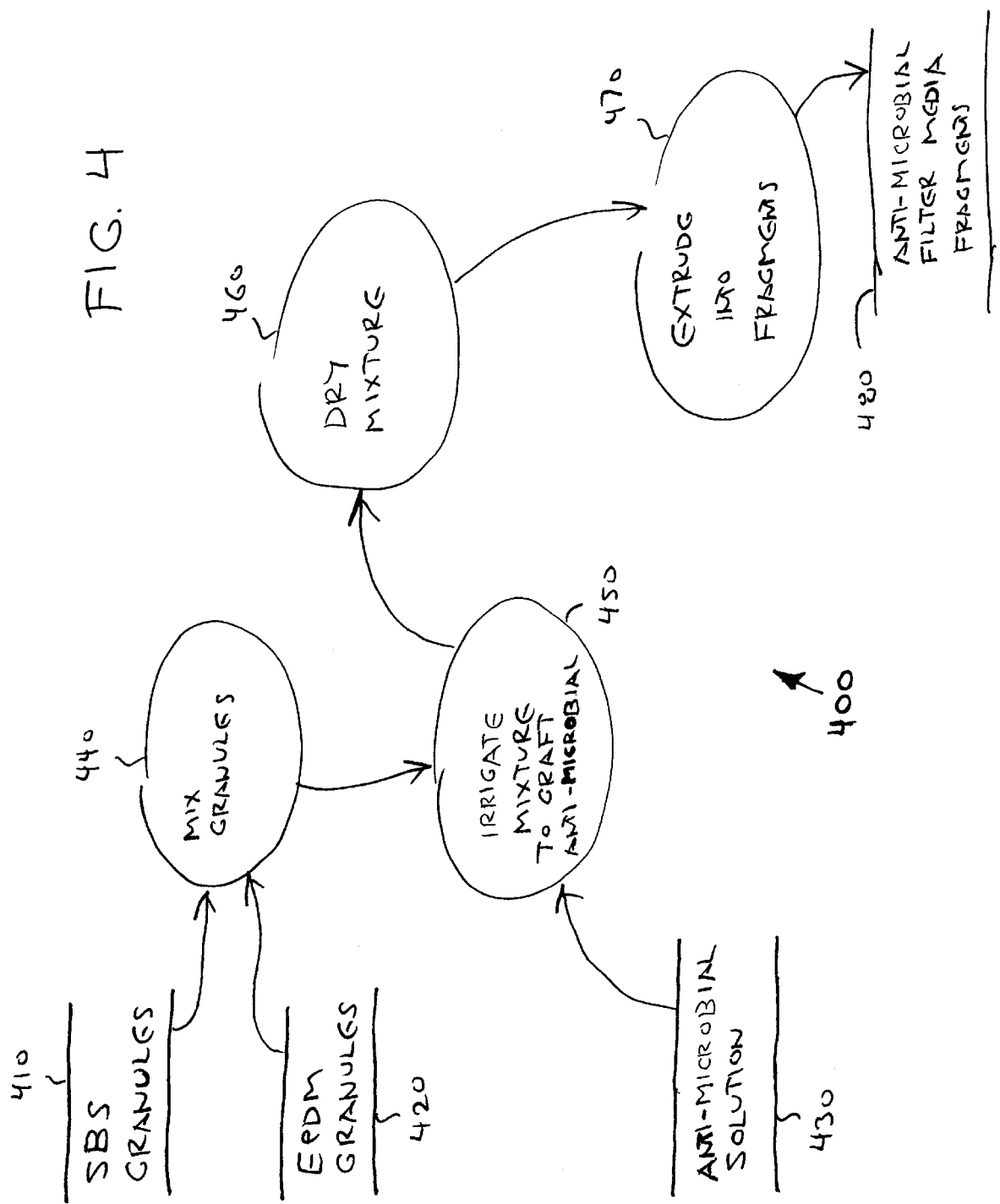
FIG. 4 is a process flow diagram of a method for fabricating the copolymer fragment of FIG. 1.

Method 400 of FIG. 4 begins with initial materials of SBS granules 410, EPDM granules 420, and an antimicrobial solution 430. An organosilane antimicrobial compound not susceptible to self-condensation in water is particularly desirable for use in solution 430 for a number of reasons including the fact that the solution can be or include water.

One suitable compound is of the type described in U.S. Pat. No. 5,954,869 to Elfersy et al. (referred to herein as "the '869 Patent"), hereby incorporated herein by reference, particularly the portion from Column 5, line 20 through Column 22, line 8. The terminology used in the '869 patent is employed only for the purpose of describing particular embodiments. Accordingly, nothing in the description of exemplary antimicrobial agents in the '869 Patent or its file history is intended as limiting. As used herein and in the '869 Patent, the singular forms "a," "an" and "the" include plural referents unless the context clearly dictates otherwise. A suitable commercial product of this type is identified as "AM-500" and marketed by Bioshield Technologies, Inc. of Norcross, Ga.

The term "effective amount" of a compound, product, or composition means an amount sufficient to provide the desired result. As pointed out in the '869 Patent, the exact amount required will vary from substrate to substrate, depending on the particular compound, product, or composition used, its mode of administration, and the like. Thus, it is not always possible to specify an exact "effective amount." However, an appropriate effective amount may be determined by one of ordinary skill in the art informed by the instant disclosure using only routine experimentation.

As used herein and in the referenced '869 Patent, the term "antimicrobial" has a general meaning, referring to the property of the described compound, product, composition, or article to reduce the proliferation of microbial organisms, i.e., to prevent or reduce the growth, spread, formation or other livelihood of the organisms. Microbial organisms include bacterial pathogens, viruses, protozoa, molds, or other organisms likely to cause spoilage or infection, and of course can also include organisms whose proliferation is not necessarily a problem, e.g., "friendly" bacteria.

Method 400 begins with act 440, representing mixing the SBS and EPDM granules together at the particle level. Mixing need not be entirely thorough to be effective. Mixing can simply consist of dumping granules 410 and 420 into a common volume of solution, in which case the next act 450 of method 400 is performed together with mixing act 440.

Act 450 represents irrigating the mixture to graft antimicrobial compound in solution 430 to polymer of granules 410 and 420. As mentioned above, irrigation of granules with solution can be performed in a number of different ways. Accordingly, process 450 has many possible variations, including immersing granules 410 and 420 in solution 430, spraying solution 430 onto granules 410 and 420, applying a stream of solution 430 to granules 410 and 420 inside an operating centrifuge, etc. Irrigation continues until an amount of grafting desirable for a particular implementation has taken place. In one embodiment of act 450, granules are immersed in an "AM-500" antimicrobial solution (2%–10% concentration of antimicrobial agent, by mass) for five minutes at room temperature. Preferably, the resultant antimicrobial-grafted granules contain at least about 0.5% antimicrobial agent, by mass.

Many variations of method 400 can be suitably employed. In one variation, for example, acts 440 and 450 are performed simultaneously, e.g., by dumping granules of each type into a static or stirred volume of solution where they are mixed and irrigated. In another variation, processes 440 and 450 are performed in a sequence opposite that depicted in FIG. 4. In such a variation, granules are irrigated (and perhaps also dried) in separate subprocesses before they are mixed together. In other variations where the benefits of irrigating both SBS and EPDM are not required, granules of just one type of polymer are irrigated. For example, just SBS can be irrigated if the EPDM matrix of the eventual polymer fragment does not need to have the benefit of antimicrobial properties.

The product of act 450 is a mixture of granules 410 and 420 with antimicrobial compound grafted to polymer of the granules and with some residual solution in the mixture. Act 460 represents drying the liquid from the mixture. In the example of method 400, act 470 represents extrusion of the dried granules into fragments by process 470. In variations where the benefits of drying act 460 or any subsequent processing are not required, they can be suitably omitted. In such variations, the end product is considered to be the product of act 450.

Drying act 460 can be performed by any suitable technique, including simply exposing the mixture of granules to a static air mass at ambient temperature. More efficient drying techniques, such as forced-air or heated drying can also be employed. The extent of drying depends on the need to a particular implementation. Overnight static drying is a suitable option for methods involving extrusion of the granules into fragments, e.g., by act 470. Preferably, act 460 dries the mixture of granules until the amount of solution liquid remaining in the mixture is less than 0.3–0.5%, by weight, as measured using a weight comparison before and after heat treatment analysis at 140°.

Act 470 represents extrusion of the mixed, dried granules grafted with antimicrobial compound that result from acts 440–460 into fragments of filter media such as fragments 130 of FIGS. 1–3. In an exemplary implementation of extrusion process 470, the SBS and EPDM granules are placed in the hopper of an extruder of conventional design (e.g., a two-inch Bonnot lab extruder with a hot-water external barrel heat exchanger, run at 40 RPM), which in one embodiment of the extrusion process maintains the temperature of the granular material near about 115°–135° F., far below normal extrusion temperatures for plastic products. The heat exchanger should not permit the temperature of the granular material to exceed 160° F. As discussed below, a particularly advantageous method of forming filter media permits SBS fragments to become agglomerated while still warm enough to establish molecular bonds.

In the barrel of the extruder, the EPDM quickly becomes softened, as a result of heat caused by shearing forces that result from mechanical agitation by the screw. To maintain the temperature of the granular material near the desired temperature, the heat exchanger typically acts as a cooling device to conduct some of this heat away from the material. At the beginning of the process and any other appropriate times, the heat exchanger can apply heat to the material to raise it to the desired temperature.

The extruder's screw mixes the softened EPDM and the SBS, forming a matrix of EPDM surrounding and interlinked to SBS granules. Because the SBS does not melt, some air spaces (i.e., bubbles) remain in the mixture. The softening process occurs quite rapidly in the extruder, permitting very short dwell times (such as less than one minute), which permits rapid manufacturing.

The composite material is pressed through a circular die with a central rod or mandrel (not shown), at a unit flow rate of about 6 g/sec. in one embodiment using a cross section of particular size. If left undisturbed at this flow rate, the material would form a cylindrical body with an axial hole. However, radial arms at the end of the die, or a similarly configured cutter just outside the nozzle (not shown), section the cylindrical bodies into segments, perhaps four sections. An automatic knife (not shown) fires every two seconds or so, cutting off lengths of the sections.

Another way of producing such fragments is to use a smaller die, with a hole approximately one centimeter across, to produce the fragments directly rather than by cutting them radially from a cylindrical form.

Upon passing through the die, the SBS granules, which have compressed somewhat from being forced through the die, re-expand, "fluffing" the extruded material while it slowly cools. Air remaining in the mixture further assists the expansion. After the extruded material is cut into suitable lengths, it slowly cools outside the extruder, and the granules continue to expand for a time, causing additional fluffing.

The EPDM matrix 190 (see FIG. 1) forms a durable but permeable structure for the SBS granules 180 and provides mechanical integrity to resulting fragments 130. Thus, fragments 130 formed in accordance with the preferred method resist breaking or cracking absent extreme elastic deformation, despite the presence of fissures 370. Also, fragments of such bodies do not detach easily in the form of flakes, crumbles, or dust.

The fluffing effect (conventionally undesired in extrusion processes) is actually beneficial in the inventive process because it forms inter-granular fissures 370 in the EPDM matrix, throughout the structure. However, the fissuring is not so great as to cause loss of structural integrity. As noted above, fissures are preferred to facilitate rapid passage of oil into fragments 130 and to reduce the incidence of gel blocking, permitting continued absorption.

Slight irregularities in the flow rate, the fluffing effect, and the way in which the knife cuts the material can cause fragments of different sizes to form. For example, a larger-than-normal fragment can form when two adjacent sections link together. A smaller-than-normal fragment can form when a section breaks apart if fissuring caused by fluffing happens to occur along a fracture line. The resulting fragments 130 are similar in size and general appearance to popcorn.

In another advantageous method of the invention, irrigation of granular precursors to polymer fragments is replaced by irrigation of the polymer fragments themselves with a solution containing an antimicrobial compound. In another advantageous method of the invention, a mass of polymer filter media (e.g., comprised of agglomerated or loosely connected polymer fragments) is suitably irrigated with a solution containing an antibacterial compound. For example, a filter module according to various aspects of the invention can "filter" a recirculating stream of such solution for sufficient time to ensure grafting of antimicrobial compound to significantly all polymer surfaces that can be expected to contact liquid to be purified during the filter module's actual use. Alternatively, such a filter module can be immersed in a static volume of antimicrobial solution for a suitable grafting time.

As mentioned above, a particularly advantageous method of forming filter media forms a coherent block of filter media from fragments of media that become agglomerated while warm enough to establish molecular bonds between fragments. In the method, the fragments are fed directly from a heat-generating process (e.g., extrusion) into a form. The fragments are allowed to cool after suitably filling the form to form a coherent block of media within the form. The form can then be removed (e.g., by shearing) or left in place as structure for containing the block of media. In a variation of filter system 300 employing such a block of media, for example, hopper 310 can be replaced with the block. In such a variation, the block can be suspended from a bracket by flexible support structure and a tray that is dimensioned to support the block on it. Pertinent disclosure is found in the brochure "ULTRA-URBAN filter with OARS Onboard," presently available at www.abtechindustries.com and the web page www.abtechindustries.com/Ultra_UrbanFilter.htm, both of which documents are incorporated herein by reference.

Figure 5:
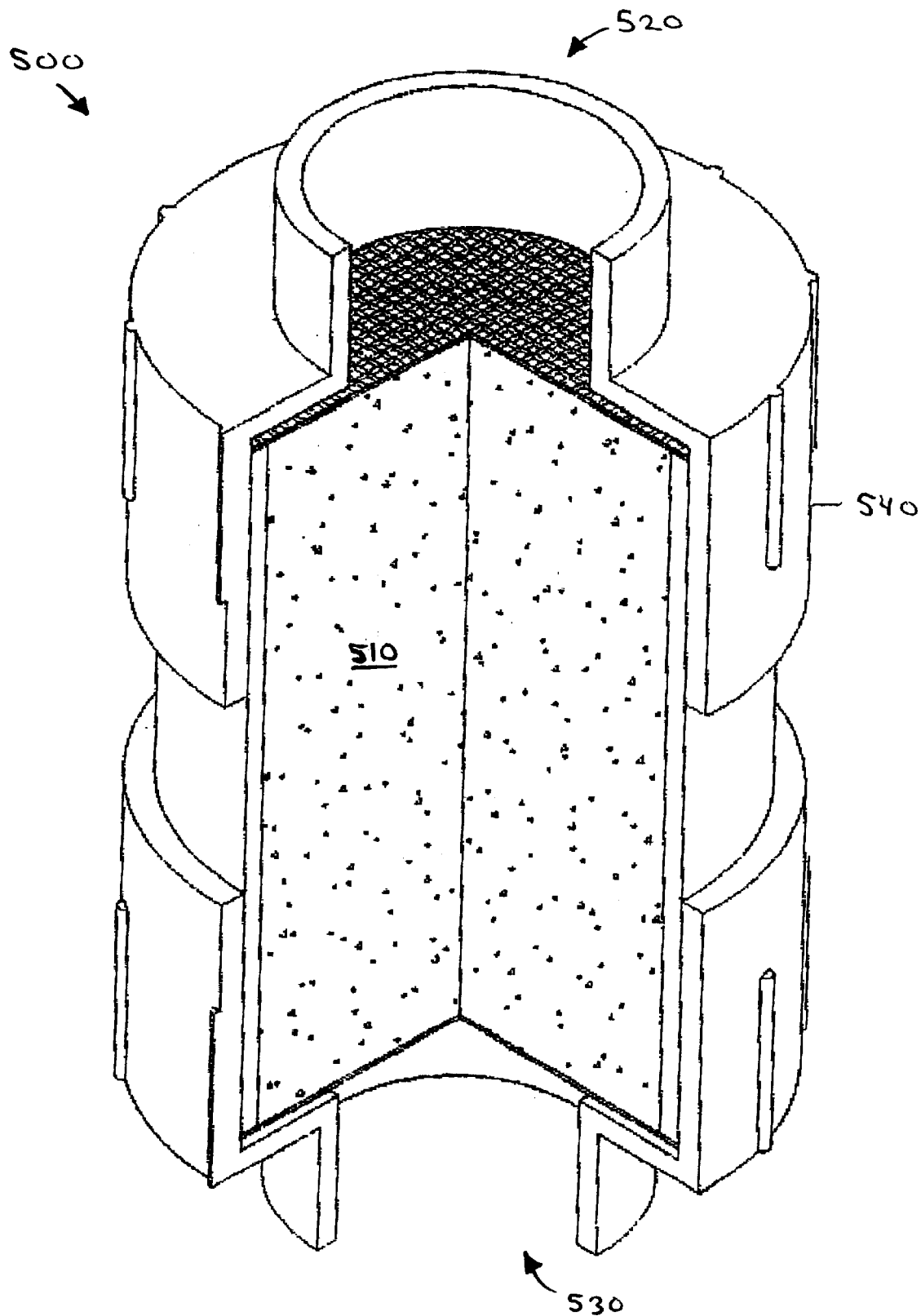
FIG. 5 is a cutaway perspective view of a filter cartridge employing filter particles that have been irrigated with an antimicrobial solution after agglomeration of the particles into a mass of filter media according to various aspects of the invention.

An advantageous variation of a filter module according to various aspects of the invention houses filter media within a cartridge. During operation, such a filter module directs water flow through the cartridge and through the filter media housed in it. An exemplary filter module 500, which may be better understood with reference to FIG. 5, includes a cartridge 540 having apertures 520 and 530, shown in this embodiment as being at opposite ends. Cartridge 540 is packed with polymer filter media 510 (or alternatively contains a quantity of such media without being packed) that includes an antimicrobial compound grafted to it. Filter media 510 can have the antimicrobial compound grafted to it by one or more of the following: (1) irrigating polymer granules with an antimicrobial solution of the type discussed above and forming them into fragments; (2) irrigating polymer fragments formed from polymer granules (or other polymer precursor structures); or (3) irrigating filter media formed from polymer fragments (or other polymer precursor structures), for example by subjecting bound fragments (whose particulate structure may be lost after being agglomerated) of filter module 500 to recirculating flow of antimicrobial solution via apertures 520 and 530.

In a further variation, flow of water (or other liquid to be decontaminated) is directed into a central aperture of a cylindrical aggregation or agglomeration of polymer particles having antimicrobial compound grafted to them. The water is forced radially outward through the filter media comprised of the particles to exit the filter module through a porous outer wall of the filter media cylinder. The preferred radius of the cylinder is between about 4 and 5 inches.

The detailed description of preferred exemplary embodiments above mentions the detailed description portions of certain patents and publicly accessible documents (including U.S. Pat. Nos. 6,106,707 and 5,954,869), all of which are hereby incorporated herein by reference. The detailed description portions of all materials incorporated by reference into these listed patents or applications, including U.S. Pat. Nos. 5,411,585; 5,064,613; 5,145,592; and 4,390,712, and the publication entitled "A Guide to DC Silane Coupling Agent" (Dow Corning, 1990), are also specifically incorporated herein by reference.

Public Notice Regarding the Scope of the Invention and Claims

The inventor considers various elements of the aspects and methods recited in the claims filed with the application as advantageous, perhaps even critical to certain implementations of his invention. However, the inventor regards no particular element as being "essential," except as set forth expressly in any particular claim.

While the invention has been described in terms of preferred embodiments and generally associated methods, the inventor contemplates that alterations and permutations of the preferred embodiments and methods will become apparent to those skilled in the art upon a reading of the specification and a study of the drawings. For example, particular variations can employ of an antimicrobial compound other than an organosilane compound not susceptible to self-condensation in water. In other variations, polymer granules or fragments according to various aspects of the invention can be employed in pipes, industrial filtration systems, filtration cartridges, and any other types of systems where the dual-action decontamination performed by such granules and fragments is desired.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim. For example, method claims that do not recite acts regarding drying and extrusion read on methods that include, and exclude, such acts.

In addition, aspects of the invention are particularly pointed out in the claims using terminology that the inventor regards as having its broadest reasonable interpretation; the more specific interpretations of 35 U.S.C. §112(6) are only intended in those instances where the terms "means" or "steps" are actually recited. The words "comprising," "including," and "having" are intended as open-ended terminology, with the same meaning as if the phrase "at least" were appended after each instance thereof.

What is claimed is:

1. A fragment of filter media comprising:
   (a) an oil-sorbent, hydrophobic copolymer in a matrix of compliant, hydrophobic, olefinic polymer; and (b) an antimicrobial compound grafted to the copolymer and polymer;

wherein the fragment is in contact with runoff water;

whereby the fragment is capable of both sorbing oil from the runoff water and reducing proliferation of microbial organisms.

2. The fragment of claim 1 wherein:

(a) the antimicrobial compound is an organosilane compound not susceptible to self-condensation in water;

(b) the compliant, hydrophobic polymer is ethylene propylene monomer or ethylene propylene diene monomer; and (c) the oil-sorbent, hydrophobic copolymer is styrene-butadiene-styrene or hydrogenated styrenic block copolymer.

3. A filter system comprising:

(a) a multitude of irregular, macroscopic fragments comprised of an oil-sorbent, hydrophobic copolymer in a matrix of compliant, hydrophobic polymer;

(b) an antimicrobial compound grafted to the fragments; and (c) a filter module supporting the fragments adjacent to an aperture and in contact with runoff water passing into contact with the fragments via the aperture;

whereby the filter system is capable of both sorbing oil from the runoff water and reducing proliferation of microbial organisms.

4. The filter system of claim 3 wherein the antimicrobial compound is an organosilane compound not susceptible to self-condensation in water.

5. The filter system of claim 3 wherein:

(a) the compliant, hydrophobic polymer is ethylene propylene monomer or ethylene propylene diene monomer; and (b) the oil-sorbent, hydrophobic copolymer is styrene-butadiene-styrene or hydrogenated styrenic block copolymer.

6. A method for improving chemical and biological purity of a runoff water stream containing contaminants, the method comprising directing flow of the water stream through interstices of a multitude of irregular, macroscopic fragments that:

(a) are comprised of hydrophobic copolymer in a matrix of compliant, hydrophobic polymer and are sorbent of the contaminants; and (b) have antimicrobial compound on their surfaces;

whereby one or more targeted contaminants are sorbed from the water and proliferation of microbial organisms is reduced.

7. The method of claim 6 wherein, prior to directing flow of the water stream, the water stream contains hydrocarbons and wherein the fragments are sorbent of hydrocarbons.

8. The method of claim 7 wherein directing flow comprises directing flow of the water through fragments further comprised of an antimicrobial compound grafted to:

(a) a portion of the polymer of the matrix; and (b) a portion of the oil-sorbent, hydrophobic copolymer in the matrix.

9. The method of claim 8 wherein directing flow comprises directing flow of the water through fragments wherein the antimicrobial compound grafted thereto comprises an organosilane compound not susceptible to self-condensation in water.

10. The method of claim 8 wherein directing flow comprises directing flow of the water through fragments wherein:

(a) the compliant, hydrophobic polymer consists of ethylene propylene monomer or ethylene propylene diene monomer; and (c) the oil-sorbent, hydrophobic copolymer consists of styrene-butadiene-styrene or hydrogenated styrenic block copolymer.

11. The method of claim 6 further comprising supporting the fragments about an open recess within a filter module, whereby the filter module is capable of both removing oil from water passing into the open recess and reducing proliferation of microbial organisms.

* * * * *